Oct. 28, 1958                  S. G. HARRIS                  2,858,223
METHOD OF SEPARATING THE EDIBLE AND INEDIBLE
COMPONENTS OF COOKED SEAFOOD
Filed Sept. 27, 1957                                            2 Sheets-Sheet 1
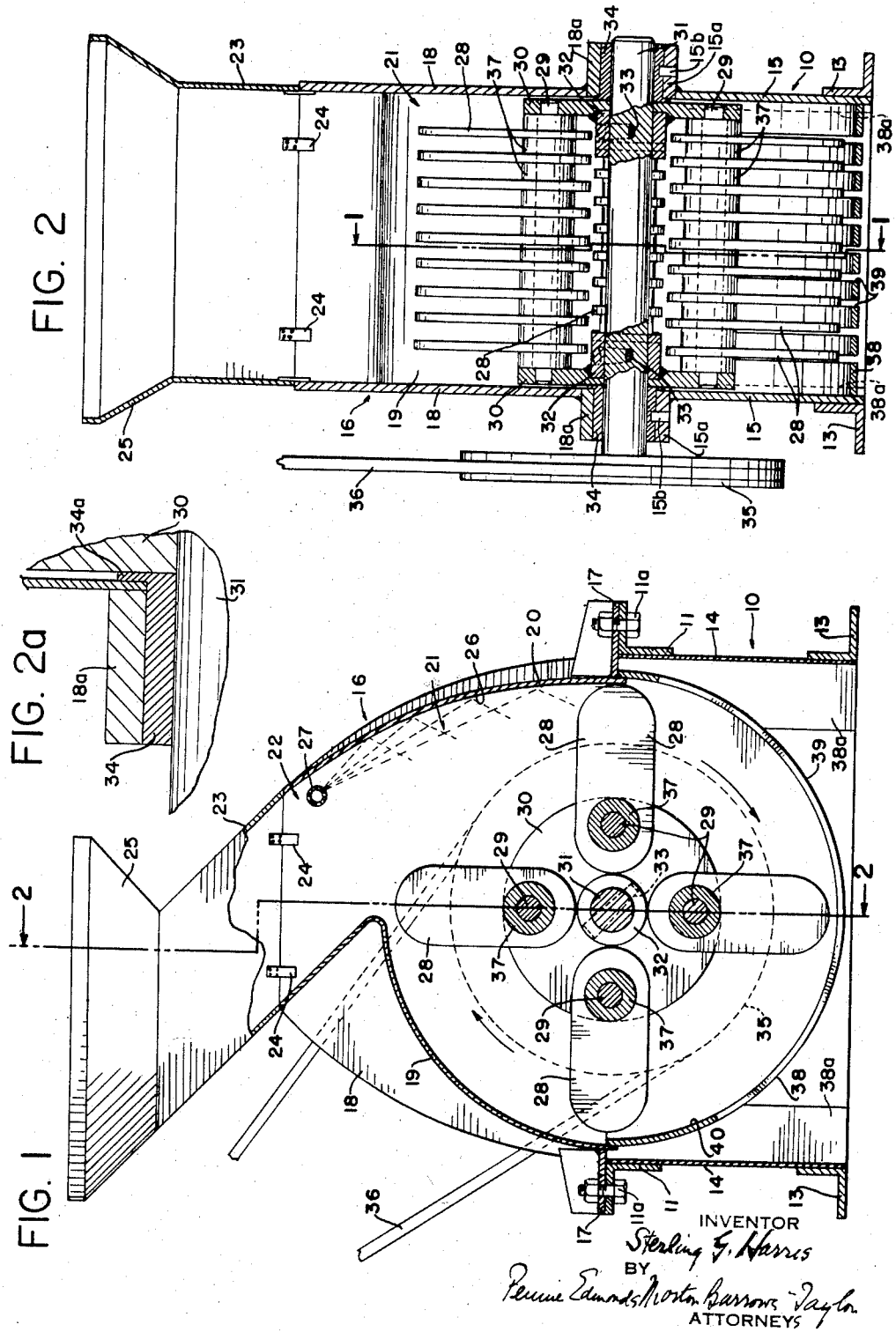
INVENTOR
Sterling G. Harris
BY
Pennie Edmonds Morton Barrows Taylor
ATTORNEYS Oct. 28, 1958 S. G. HARRIS 2,858,223
METHOD OF SEPARATING THE EDIBLE AND INEDIBLE
COMPONENTS OF COOKED SEAFOOD
Filed Sept. 27, 1957 2 Sheets-Sheet 2
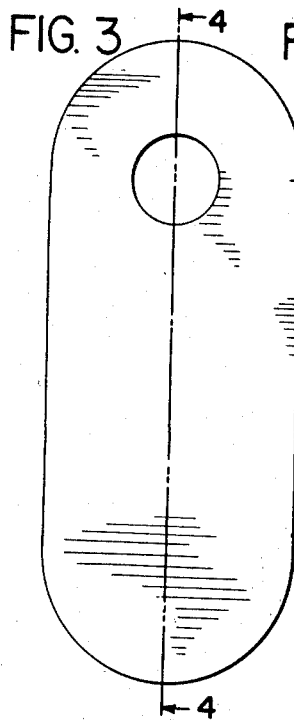
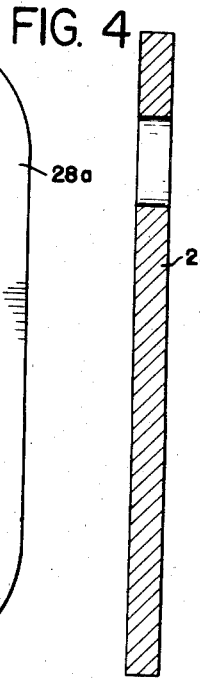
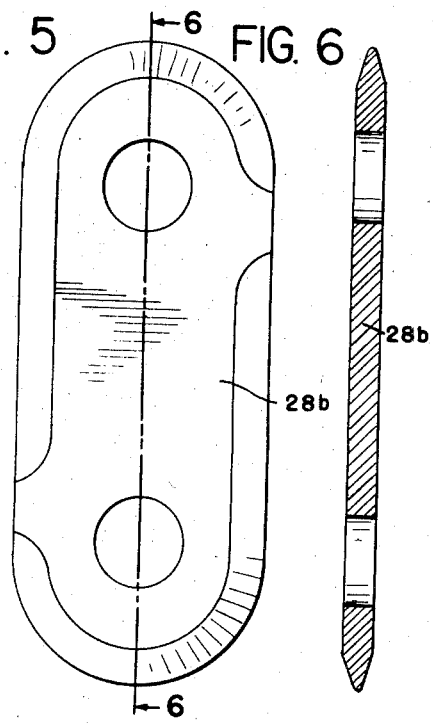
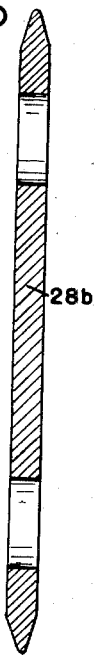
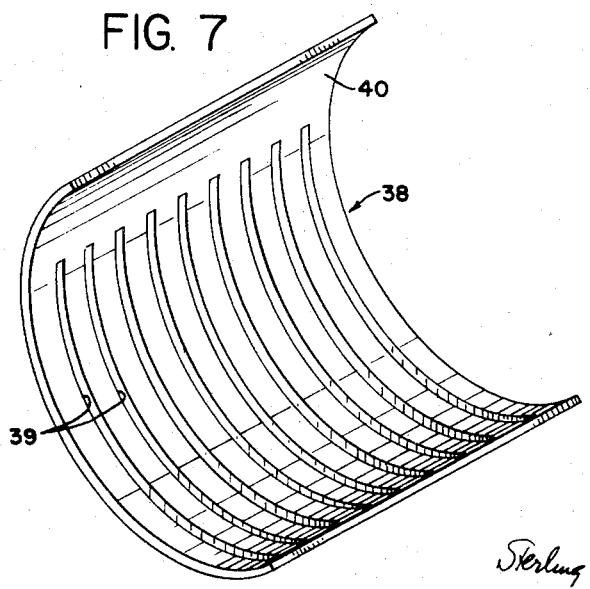
INVENTOR
Sterling G. Harris
BY
ATTORNEYS

United States Patent Office 2,858,223
Patented Oct. 28, 1958

2,858,223

METHOD OF SEPARATING THE EDIBLE AND INEDIBLE COMPONENTS OF COOKED SEAFOOD

Sterling G. Harris, Beaufort, S. C., assignor to The Blue Channel Corp., Port Royal, S. C., a corporation of Maryland Application September 27, 1957, Serial No. 686,788

6 Claims. (Cl. 99—111)

This invention relates to the recovery of meat from the carcasses of seafood of the class consisting of fish and crabs as a preliminary to using the meat in food products, such as fish sticks, fish chowder, crab cakes, etc., or shipping it in iced or frozen condition. More particularly, the invention is concerned with a novel method for the rapid and efficient recovery of the meat of fish and crabs, which eliminates the manual filleting of the fish and the hand picking of the crabs, and recovers the meat free of bony or shell material and without impairment in quality or significant reduction in the size of the pieces as compared with those produced by the prior methods. The new method thus affords substantial economies in the cost of production without off-setting disadvantages.

The essential features of the new method are the breaking up of prepared pieces of seafood and the release of the meat from the bony material associated therewith by subjecting the pieces to impact action followed by a screening operation and flotation. The preparation of the pieces for the treatment described varies with the kind of seafood but includes the elimination of inedible material, such as the viscera, scales, fins, etc., and the cooking of the pieces, until the meat shrinks from the bones. The cooked pieces are then cooled until the meat is firm and the pieces are ready for subsequent operations.

The steps in the method of subjecting the prepared pieces of seafood to impact followed by screening can be advantageously carried out in the machine disclosed in my patent application, Ser. No. 638,559, filed February 6, 1957, and a form of that machine suitable for use in the processing of fish and crabs is shown in the accompanying drawings. In the drawings:

Fig. 1 is a view of the machine partly in side elevation and partly in section on the line 1—1 of Fig. 2;

Fig. 2 is a sectional view on the line 2—2 of Fig. 1;

Fig. 2a is a view of a part of Fig. 2 on an enlarged scale;

Fig. 3 is a side elevational view of one form of impeller used in the machine;

Fig. 4 is a sectional view on the line 4—4 of Fig. 3;

Fig. 5 is a side elevational view of another form of impeller;

Fig. 6 is a sectional view on the line 6—6 of Fig. 5; and

Fig. 7 is a view in perspective of a screen plate used in the machine.

The apparatus in the form shown comprises a casing, which includes a lower section 10 generally rectangular in shape and having an open top with transverse end flanges 11 made of angle irons and means at its lower end, such as the angle irons 13 extending across its end and side walls 14, 15, for mounting the apparatus on a support above a receptacle. The casing has an upper section 16, which is provided at its lower end with transverse end flanges 17 adapted to rest upon flanges 11 and to be secured thereto by any suitable means, such as the bolts 11a. The upper casing section has flat parallel side walls 18 connected by curved walls 19, 20, formed to define the top of a chamber 21, from which a feed chute 22 extends upwardly at an angle to the vertical. The chute may have an extension 23 resting upon the upper end of the chute and held in place by lugs 24 projecting from its lower end and receivable in the upper end of the chute. The extension 23 ordinarily has a flaring peripheral flange 25 at its upper end.

The curved wall 20 of the upper casing section has a portion extending substantially vertically and having a smooth inner area providing an impact surface 26. In the operation of the machine, the impact surface may be cleaned from time to time by liquid sprayed upon it by means of a pipe 27 with jet openings, which projects through one side wall of the chute 22 and extends toward the opposite wall.

Within the chamber 21, a plurality of impellers 28 are pivotally mounted in sets on rods 29 supported at an angular spacing of 90° in spaced discs 30 mounted on a shaft 31. The discs carry collars 32 secured to their opposed faces by welding and formed with diametrical tapered openings alignable with diametrical tapered bores through the shaft. The discs and shaft are secured together by tapered pins 33 lying in the openings and bores and the shaft is mounted for rotation in a pair of bearing bushings 34 supported in upper and lower semi-cylindrical bearing housings 15a, 18a secured by welding in openings in the side walls 15, 18, respectively, of the lower and upper sections of the casing. Each bearing bushing is held against rotation in its housings by a pin 15b, which is mounted in an opening in the lower housing 15a and extends into a bore in the bushing. Each bushing 34 has a radial flange at its inner end, which lies between the discs 30 on the shaft and the side walls 15, 18 and the bearing housings 15a, 18a and acts as a thrust washer. At one end, the shaft carries a pulley 35, about which a driving belt 36 is trained.

The impellers 28 are flat metal plates having an opening near one end, so that they may be slipped on the rods 29 with spacers 37 between adjacent impellers and between the end impellers of the set and the discs 30. The spacers are of such thickness that the impellers are evenly spaced and those on one rod lie opposite the spaces between the impellers on the adjacent rods. Accordingly, two of the rods diametrically disposed carry an even number of impellers and the other two rods carry an odd number. The impellers have rounded ends and may have a length of about 5", a width of about 2", and a thickness of about ¼". In a machine suitable for operation on seafood, adjacent impellers are spaced ¼" to ½".

A semi-cylindrical screen plate 38 is mounted in the lower casing below the shaft 31 and out of the path of the impellers carried thereby. For this purpose, supporting plates 38a are secured by welding to the inner faces of the side walls 15 of the lower section of the casing adjacent the end walls 14 and the upper ends of the plates are formed with curved surfaces conforming to the curved lower surface of the screen plate. When the screen plate is in operative position, it rests upon the upper ends of the supporting plates with one end lying against the under side of the flange 17 projecting from the wall 20 of the upper section 16 of the casing and its other end lying in slightly overlapping relation to the lower end of the curved wall 19 of the section 16. Upon removal of the upper section of the casing, the screen plate can be removed by being lifted from the supporting plates.

The screen plate 38 is formed with a plurality of parallel lengthwise slots 39 between its ends and, at the end of the plate adjacent the impact surface 26, the slots terminate relatively close to the end of the plate. At the other end of the plate, the slots terminate a substantial distance from the end of the plate to provide a solid area 40 lying approximately diametrically opposite the impact surface 26. The plate 38 is preferably about ¼" or somewhat thicker and has ribs approximately square in cross-section and plates having slots of different width may be advantageously used depending on the material being treated, as will be later explained.

In the practice of the method, pieces of seafood are first prepared and such preparation varies with the kind of seafood. When the seafood is crabs, the crabs as delivered at the dock are first cooked to coagulate and shrink the contents of the legs and claws and to shrink the meat within the body. The cooking is carried out in conventional equipment, such as retorts or steam boxes, and the cooking conditions depend upon the condition and weight of the crabs, the fatter and heavier crabs requiring a more severe treatment. The cooking times and temperatures vary widely and must be determined by experience. The time ranges from 5 to 15 minutes, while the temperature varies from 240° F. to 250° F., a cook from 8 to 12 minutes at 250° F. being ordinarily best for the crabs, the meat of which is commonly marketed iced or frozen or canned. Upon completion of the cooking operation, the crabs are chilled and, preferably, the chilling is effected as soon and as rapidly as possible. The purpose of the chilling is to make the meat hard and firm and also to cause the meat to shrink further, while the shell surrounding the meat in the body and claws remains unchanged, with the result that the meat separates from the shells. Satisfactory results are obtained when the crabs are chilled by being kept at a temperature from 40° F. to 55° F. for six hours or longer.

The pieces of the crabs to be processed consist of the stripped bodies and the legs and claws and the meat is recovered from the pieces of the two kinds in separate operations. A stripped body is prepared by removing the carapace and the legs and claws. The mouth parts and gills are then removed and the viscera and fat are gouged or scraped out of the body. Finally, the apron is removed and the stripped body is then ready.

The stripped bodies prepared as described and the legs and claws are fed into the Harris machine in separate operations and with the shaft 31 of the machine turning at a speed within the range from 250 to 600 R. P. M. If the speed of the impellers is too low, the output of the machine and its efficiency are low, while, if the speed is too high, the meat recovered is in smaller pieces, although a greater production is attained. A speed of about 300 R. P. M. appears to be the optimum. When a stripped body is fed into the machine and is struck by a set of impellers, it is caused to travel at high velocity across the bottom of the feed chute of the machine and it is abruptly stopped by impingement upon the impact surface 26 of the casing. The impacts of the impellers against the body and of the body against the casing surface break up the body to a greater or less extent and free the meat from the bony material. The material resulting from the impacts and consisting of pieces of meat and bony material are then screened by being advanced by the impellers of the machine over the surface of the plate 38. As the material is caused to travel at high speed along the surface of the plate and the plate is arcuate, the material is subjected to centrifugal force which tends to force the material through the elongated openings in the plate. Any material, which does not escape through the openings, is carried along the inner surface of the wall 19 of the upper casing section and then again caused to impinge against the impact surface 26. The cycle of operations is repeated until all the material has passed through the openings in the plate.

The recovery of meat from the crab claws and legs is accomplished by feeding them into the machine, where they are subjected to impact and screening in the same manner as stripped bodies. In the treatment of claws and legs, the impellers 28a, which are used, have smooth, peripheral edges, while the impellers 28b, which are employed when stripped bodies are to be treated, are preferably sharpened, as shown in Figs. 5 and 6. The impellers 28b may be thinner than impellers 28a so that, in a given machine, in which sets of eight and nine impellers 28a are required, the sets of impellers 28b consist of ten and eleven impellers. The impellers 28b have openings near their opposite ends and are sharpened at both ends so that their positions on a rod can be reversed when the sharpened edge at one end becomes dull.

When the machine is employed for operations on claws and legs, the slots in the plate 38 may have a width of ¼", ⁵⁄₁₆", or ⅜" in width, depending on the size of the claws and legs. When the machine is used for operating on stripped bodies, the slots may have a width of ¼" to ½" with a width of about ⁵⁄₁₆" optimum for most purposes. When recovery of the meat in large pieces is desired, a plate with slots of a width of ⅜" to ½" should be used. Small pieces of meat, which have issued from the machine attached to pieces of shell, may be recovered by running the pieces of shell through the machine and using a screen plate with slots of a width of ⅛" to ¼".

When fish are to be processed in accordance with the method, the head, tail, fins, scales, and viscera are removed from each fish and the stripped fish bodies remaining are then cooked until the flesh shrinks from the bones. The cooking may be carried out in water heated in an open bath to 212° F. or in a bath in a closed retort, in which a temperature above 212° F. can be produced. The time of cooking varies with the weight and kind of fish and a cooking time of about 8 to 10 minutes at 212° F. is satisfactory for an unfrozen stripped fish body weighing about 2 lbs. If the fish body is frozen or it is larger and thus has thicker meat, a longer cooking time is required. At the completion of the cooking operation, the cooked stripped bodies are cooled to make the meat become firm and such cooling may be done in the same manner as with crabs. If desired, the skin may be removed from the cooked bodies or it may be left in place and removed from the processed material during inspection thereof.

In the use of the machine in the treatment of fish, the cooked stripped fish bodies are fed into the machine and struck by the impellers so that they are subjected to impact by the impellers and by their impingement on the surface 26 of the casing. The resulting material is then screened by being passed over the plate 38, the operations being repeated until all the material has been discharged through the plate.

In the machine in a form for use with fish, the impellers are preferably sharpened, as shown in Figs. 5 and 6. The screen plate employed varies with the size of the fish and a plate with slots ¼" wide separated by bars ¼" wide has been found to be satisfactory in the treatment of fish weighing about 2 lbs. When larger fish are processed or larger pieces of meat are desired, a plate with slots of a width of ⅜" to ½" may be used.

The meat and the bony material discharged through the screen plate 38 in the treatment of stripped crab and fish bodies and crab claws and legs are separated in a flotation tank containing a brine of such salinity that the meat floats and the bony material sinks. If desired, the machine may be mounted above the tank and discharge directly into it and, when such an arrangement is used, the pipe 27, which is used to clean the impact surface 26, is supplied with brine to avoid dilution of the bath in the tank. A flotation tank suitable for the purpose is illustrated and described in my Patent 2,608,716 issued September 2, 1952. The tank of the patent has an overflow for discharge of the separated meat upon an inspection belt, while the bony material is carried out of the tank by means of an inclined conveyor belt. The meat on the inspection belt may be washed to remove adhering brine and, during the inspection, any pieces of cartilage, bone, shell, and skin can be removed and discarded. Pieces of bony material, to which pieces of meat adhere, are also removed and may be processed a second time for recovery of the meat. Following the inspection, the crab meat is ready to be packed for distribution as fresh iced meat or it may be frozen or canned, used in crab cakes, etc., while the meat of the fish is in a form suitable for use in cakes, chowder, fish sticks, etc.

Important advantages afforded in the recovery of crab meat by the method of the invention are the reduced amount of handling with a corresponding reduction in contamination and the speed with which the meat can be cooled from the high cooking temperatures down to temperatures low enough to inhibit bacterial growth. In the hand picking of crabs, the cooked crabs are reduced in temperature to 40° to 55° F. before the picking starts. The picking takes a considerable period of time and is followed by inspection, so that the meat warms up and remains for a considerable period in a range of temperatures best suited for rapid bacterial growth before it is again cooled to temperatures low enough to inhibit further bacterial growth. In the practice of the new method, the stripping of the crab bodies requires only a short time and the bodies and claws and legs are then fed to the machines and quickly passed therethrough to fall into the brine in the flotation tanks. The brine is preferably maintained at a temperature from 40° to 50° F., at which bacterial growth is almost completely inhibited. Thus, the period during which the meat is exposed to temperatures favorable to bacterial growth is very short.

The new method may be employed to particular advantage in the preparation of fish for use in fish sticks. At the present time, fish sticks are made by filleting large fish and compressing the fillets into blocks, which are frozen and then sawed into sticks, which are breaded, cooked, cooled, packed, and frozen. The preparation of the fillets is done by hand and, in order to keep the labor charges low, only large fish are filleted. In the recovery of the meat of fish by the new method, it is possible to make use of fish of a size which cannot be economically employed in the production of fish sticks by hand filleting methods. The new method thus permits the use of fish which are much less expensive than the large fish heretofore required and, accordingly, effects economies in the cost of production.

This application is a continuation-in-part of my application Serial No. 638,559, filed February 6, 1957.

I claim:

1. A method of recovering the meat from the carcases of seafood which comprises preparing a piece of seafood consisting of edible meat and the bony material in direct association therewith, the meat being cooked and shrunk from the bony material, subjecting the piece of seafood to impact by striking it a blow causing it to travel at high speed and then abruptly stopping it, screening the material resulting from the impact by causing the material to travel over long narrow openings extending in the direction of travel while subjecting the material to a force tending to cause it to pass through the openings, and subjecting the meat and bony material, which have passed through the openings, to a flotation operation, in which the meat floats and the bony material sinks.

2. The method of claim 1, in which the cooked piece of seafood is cooled to cause the meat to become firm.

3. The method of claim 1, in which the seafood is fish and the step of preparing the piece for subsequent treatment includes the removal of the head, tail, fins, scales, and viscera from a fish carcass.

4. The method of claim 1, in which the seafood is crabs and the piece to be treated is prepared by cooking a crab, cooling the cooked crab to cause the meat to become firm, and stripping from the crab body the legs and claws, the gills, viscera, and fat, and the carapace and apron.

5. The method of claim 1, in which the seafood is crabs and the piece to be treated is a claw.

6. The method of claim 1, in which the material is caused to travel along a curved path and is thereby subjected to centrifugal force during the screening operation.

References Cited in the file of this patent

UNITED STATES PATENTS

| | | |
|---|---|---|
| 2,608,716 | Harris | Sept. 2, 1952 |
| 2,734,540 | Geisler | Feb. 14, 1956 |
| 2,787,549 | Heald | Apr. 2, 1957 |
| 2,799,584 | Robertson | July 16, 1957 |